(12) United States Patent
Dumkow et al.

(10) Patent No.: US 8,025,083 B2
(45) Date of Patent: Sep. 27, 2011

(54) TUMBLER CARRIER FOR A REFRIGERATOR WITH A BEVERAGE DISPENSER

(75) Inventors: Irene Dumkow, Sontheim (DE); Adolf Feinauer, Giengen (DE); Klaus Flinner, Zöschingen (DE); Bernd Heger, Haunsheim (DE); Peter Nalbach, Kirchheim/Nabern (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 1007 days.

(21) Appl. No.: 11/919,201

(22) PCT Filed: Apr. 6, 2006

(86) PCT No.: PCT/EP2006/061378
§ 371 (c)(1),
(2), (4) Date: Oct. 24, 2007

(87) PCT Pub. No.: WO2006/120096
PCT Pub. Date: Nov. 16, 2006

(65) Prior Publication Data
US 2010/0218848 A1    Sep. 2, 2010

(30) Foreign Application Priority Data
May 10, 2005  (DE) .......... 10 2005 021 552

(51) Int. Cl.
*B65B 1/04* (2006.01)
(52) U.S. Cl. ......... 141/378; 141/351; 141/360; 141/369
(58) Field of Classification Search ............ 141/83, 141/94–96, 192, 198, 351, 360, 361, 369, 141/377, 378; 73/290 R; 62/389; 222/129.1; 312/128, 129.1, 136, 313, 327
See application file for complete search history.

(56) References Cited

U.S. PATENT DOCUMENTS

| | | | | |
|---|---|---|---|---|
| 5,373,874 A | * | 12/1994 | Shieh | 141/283 |
| 5,507,329 A | * | 4/1996 | Shub | 141/351 |
| 5,782,380 A | * | 7/1998 | DiSanto | 222/2 |
| 5,918,773 A | | 7/1999 | Donovan et al. | |
| 6,138,869 A | * | 10/2000 | DiSanto | 222/2 |
| 7,470,364 B2 | * | 12/2008 | Oranski et al. | 210/198.1 |
| 2008/0174219 A1 | * | 7/2008 | Kim et al. | 312/405 |
| 2008/0190132 A1 | * | 8/2008 | Voglewede et al. | 62/389 |

OTHER PUBLICATIONS

International Search Report PCT/EP2006/061378.

* cited by examiner

*Primary Examiner* — Gregory Huson
*Assistant Examiner* — Jason Niesz
(74) *Attorney, Agent, or Firm* — James E. Howard; Andre Pallapies

(57) ABSTRACT

The invention relates to a support carrier for supporting a container to receive cooled goods from a cooled goods dispensing machines delivering cooled liquids and water ice cubes. Cooled goods dispensing machines are often integrated into refrigerators in such a way that a refrigerator door is provided with a recess into which a drink container is set. For the recess to be useable with containers of different sizes, and at the same time to ensure a secure support for the containers, a support carrier is provided having at least one joint and which can be, for example, folded out of the recess to permit a relatively larger container to be supported relative to the recess.

14 Claims, 3 Drawing Sheets

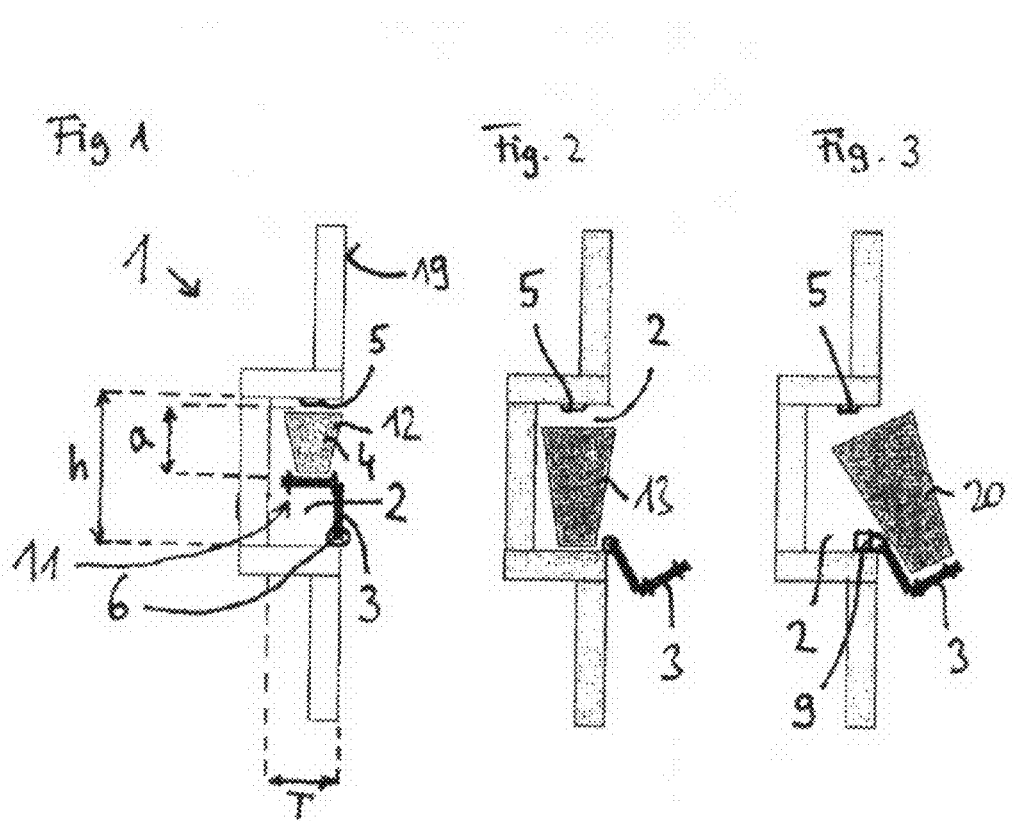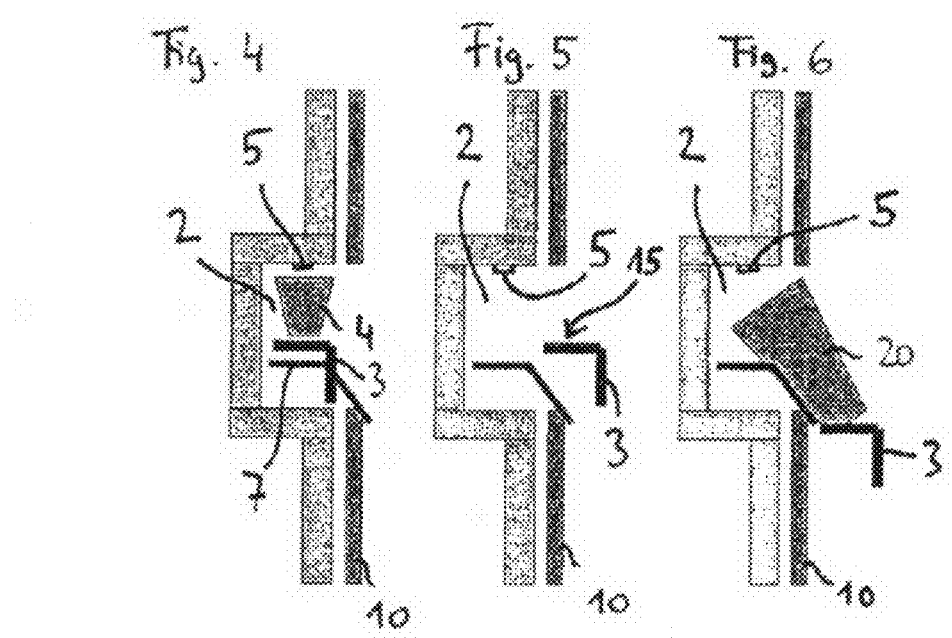

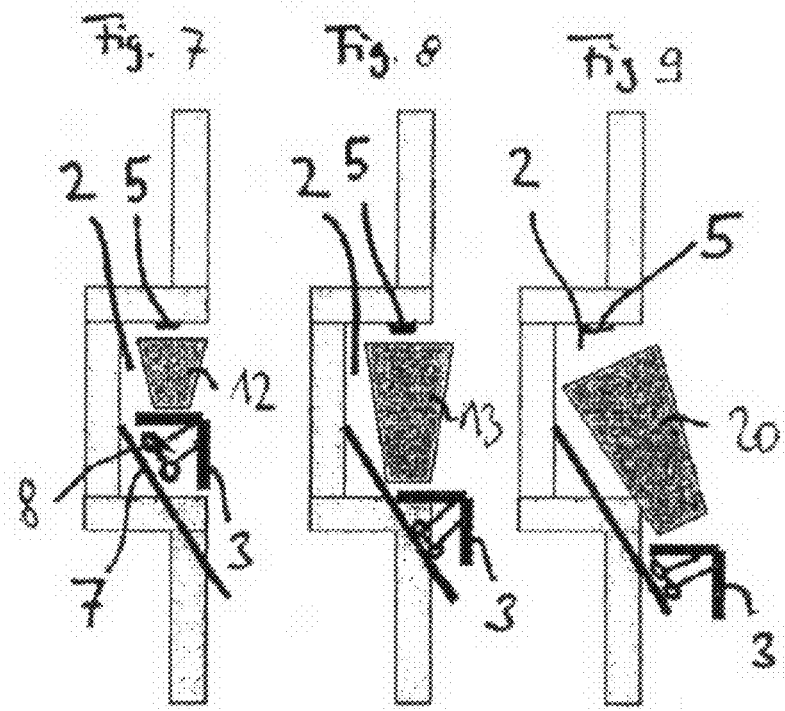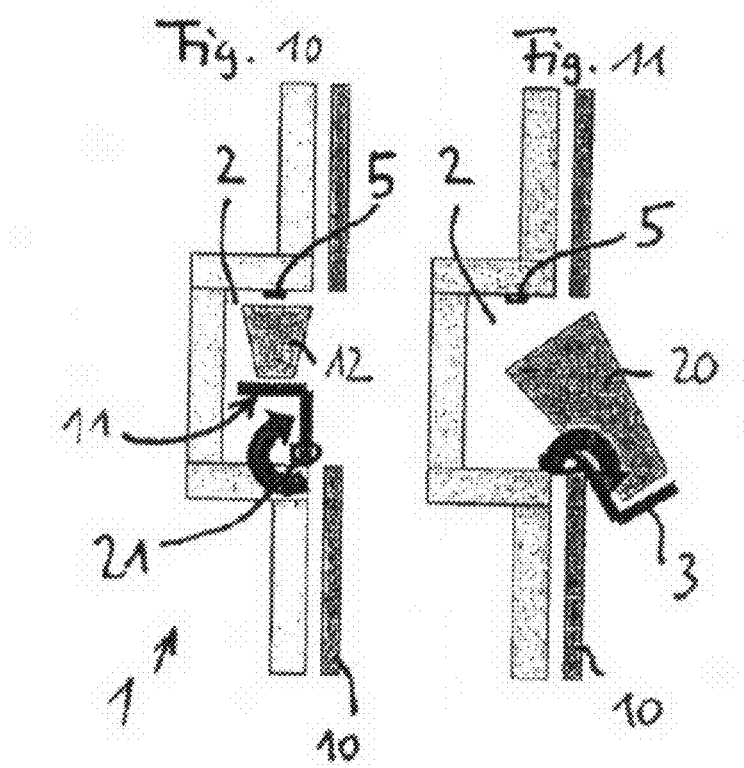

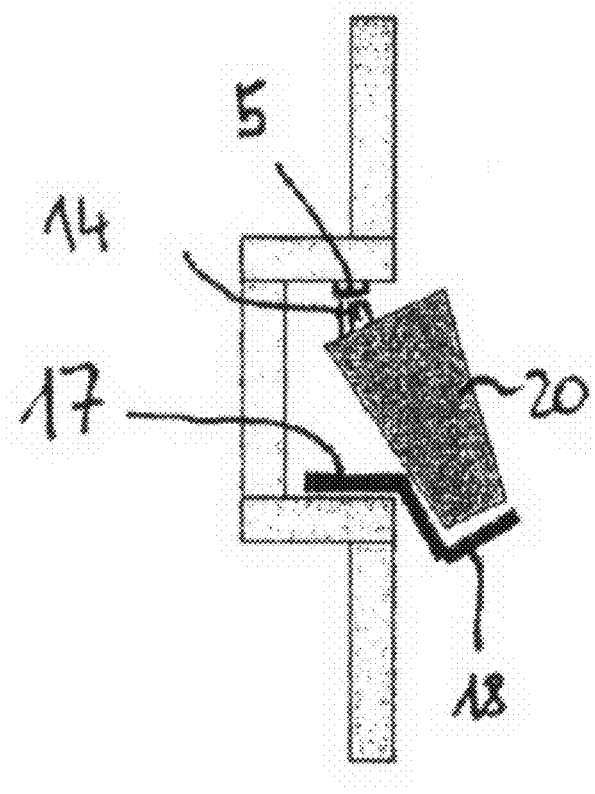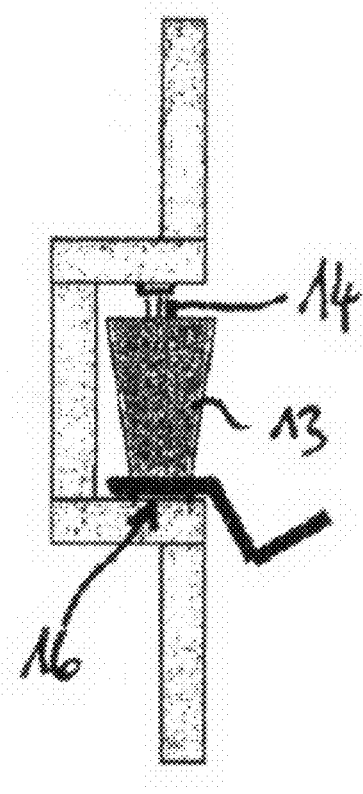

TUMBLER CARRIER FOR A REFRIGERATOR WITH A BEVERAGE DISPENSER

The invention relates to an automatic device for output of liquid or pourable goods, especially cooled goods, preferably cooled liquid, water ice pieces and/or crushed ice, into containers of different sizes with a delivery shaft for removing the cooled goods with a container, a delivery opening for the cooled goods, a carrier for the container located at a distance below the delivery opening, with the shaft being provided in the front side of the automatic device and accommodating the delivery opening.

Known automatic devices for dispensing cooled liquids or pieces of water ice have a delivery shaft on their front side which contains a delivery opening under which a vessel is placed when cooled liquid or pieces of ice are dispensed. The delivery shaft is delimited at both ends upwards and downwards and is designed to be as small as possible so that as few splashes as possible occur when a vessel is being filled. The distance which the liquid falls is to be kept as small as possible. In addition the thermal insulation of the automatic device in the area of the delivery shaft is generally less and the delivery shaft represents a heat bridge for the cooled goods within an automatic device so that for reasons of thermal insulation too the size of the delivery shaft should be as small as possible.

There are therefore known solutions in which the delivery shaft is embodied smaller than the vessel to be filled with the vessel being held under the delivery opening with the aid of the user's hand. The disadvantage of this however is that the user cannot use this hand for any other purpose. Consequently solutions of this type are impractical.

More user-friendly solutions make provision for a larger delivery shaft in which even large vessels can be placed. These types of solution are however impractical against the background of the comparatively large drop since they promote splashes when small vessels are used. Use of holders in the delivery shaft for small vessels is useful but the heat bridge formed by the thinner thermal insulation at the delivery shaft leads to significant cooling losses and to the corresponding additional costs in operating and maintaining the automatic device.

It is thus the object of the present invention to provide an automatic device for delivery of liquid or pourable goods with which different sizes of container can be easily filled without splashing, with the automatic device being able to be operated in an energy-saving manner.

In accordance with the invention this object is achieved by the automatic device as specified in the independent claim. Further embodiments which can be used on their own or in any combination with one another respectively are the subject matter of the Independent claims.

The inventive automatic device for output of liquid or pourable goods, especially of cooled goods, preferably of cooled liquids, of pieces of water ice and/or crushed ice into containers of different sizes with a delivery shaft for removing the cooled goods with a container, with a delivery opening for the cooled goods and with a carrier for a container located at a distance below the delivery opening, with the delivery shaft being provided on the front side of the automatic device and accommodating the delivery opening, provides for a carrier which can adopt at least two positions, with the carrier being able to be moved back and forth between a first position essentially within the delivery shaft and a second position essentially outside the delivery shaft.

The invention relates in particular to goods such as cooled liquids, pieces or water ice or crushed ice and thus relates especially to automatic cooling devices or ice makers. The invention can however also be applied to other liquid or pourable goods, such as hot drinks like coffee, tea or soup for example. The invention relates in particular to the delivery of corresponding foodstuffs to an end user.

The containers can be small, medium-sized or large drinking vessels or jugs. Small drinking vessels usually hold 0.2 I, medium-sized drinking vessels typically hold 0.5 I and large drinking vessels hold 1 I or more of liquid.

The delivery shaft can be embodied as a rectangular or box shaped recess in the front of the automatic device. It can however also be embodied as a recess. It is delimited on both sides, to the back, the top and the bottom by a wall of the automatic device. Advantageously the wall of the delivery shaft has thermal insulation.

The container is filled with the liquid or pourable goods via the delivery opening. So that the delivery shaft can be smaller than the container to be filled, the carrier can assume at least two, preferably three positions with a first position essentially being located within it the delivery shaft and at least one second position essentially outside the delivery shaft. The comparatively small embodiment of the delivery shaft means that a thermal bridge caused by the delivery shaft is reduced and energy thereby saved.

A small drinking vessel is placed on the carrier when it is essentially located below the delivery shaft and a large drinking vessel is placed on the carrier when it is essentially located outside the delivery shaft. The back and forth movement of the carrier thus allows a small or large container to be filled as required.

Advantageously the distance between the delivery opening and the carrier is increased by the movement of the carrier between the two positions.

The carrier can be rotated out of the delivery shaft, for example the carrier is folded out or hinged out of the shaft. A bearing can be provided for this purpose with the carrier being pivoted within the delivery shaft or on the front of the automatic device in the vicinity of the delivery shaft.

The carrier can also be moved out of the delivery shaft. A roller rail or a carriage can be used for this purpose with which he carrier can be moved out from inside the delivery shaft.

Alternatively multi-joint structures such as a four-element joint for example can effect a translation movement of the carrier. In an especially advantageous embodiment the carrier can be moved out of the delivery shaft by rotating it. With a rotating movement the carrier is both rotated and also translated. Rotational movements are especially of advantage if the automatic device is destined as a built-in device and the carrier is to project out from a panel which is attached to the front of the automatic device. A rotating movement allows different prespecified thicknesses of panel to be spanned so that delivery is possible even with different sizes of panel and different thicknesses of the panel.

The carrier can be linked movably to the automatic device, especially with a pivot joint, with a pivot movement joint or a roller rail.

The carrier for example has a holder for the container, especially a circular recess or a circular retaining hole.

The container can be a beaker or a drinking glass, especially a beaker or a drinking glass with capacities of 0.2 I, 0.5 I or 1.0 I. The height of the delivery shaft ranges from 10 cm to 15 cm, especially in a range of 12 cm to 13 cm. The depth of the delivery shaft can range from 2 cm to 5 cm, especially in a range of 3 cm to 4 cm.

The ability to be moved out also enables a container with larger dimensions and the delivery shaft, especially a jug with a capacity of 1 l or more, to be filled with cooled goods. In such cases it is not necessary to hold the jug by hand since the carrier securely holds the jug.

The carrier can be moved with a drive, especially with an electric motor. The movement of the carrier and also the delivery of liquid or pourable goods can also be automated.

In a particular embodiment the carrier is connected to a spring. The spring enables the carrier to be withdrawn or rotated in the delivery shaft. This excludes the danger of injury on a pulled-out or hinged out carrier. The force of the spring is to be dimensioned so that it is just enough to pull in or hinge back an empty carrier but retains the carrier under the load of a container in the folded-out state. The spring always moves the carrier back into the delivery shaft for example if the carrier is not holding any container.

The automatic device can be provided as a built-in device. Delivery is advantageously automated.

The carrier can adopt at least three different positions so that at least three different sizes of container can be filled without any splashes.

In a specific variation the carrier is fixed and there are at least two rigid sections of the carrier provided, with a first carrier section being essentially located inside the delivery shaft and a second carrier section being located essentially outside the delivery shaft.

In a specific embodiment the delivery opening is at an angle. An angled delivery opening also allows very large containers to be filled by inserting them at an angle into the delivery shaft.

Further advantageous embodiments and particular advantages are explained in greater detail below with reference to the following drawings which do not restrict the invention but are merely intended as examples to illustrate it.

The figures show schematic diagrams of:

FIG. 1-3 a first embodiment of an inventive automatic device for three different sizes of container with a fold-out carrier.

FIG. 4-6 a second embodiment of an automatic device suitable for building in for three different sizes of container with a moveable carrier, FIG. 7-9 a third embodiment of an inventive automatic device for three different sizes of container with a movable carrier, FIGS. 10 and 11 a fourth embodiment of an inventive automatic device suitable for building in a fold-out carrier, FIGS. 12 and 13 a fifth embodiment of an inventive automatic device with two fixed carrier sections.

FIG. 1 to FIG. 3 show a sectional view from the side through a first embodiment of an inventive automatic device in which the carrier 3 is able to be folded out. The automatic device 1 has a front side 19 into which a box-shaped delivery shaft is set. Provided in the delivery shaft 2 is a delivery opening 5 with which a container 4 can be filled with cold drinks and pieces of ice. Depending on the size of the container 4, a carrier 3 can be moved back and forth between a first position (FIG. 1) and a second position (FIGS. 2 and 3). For a small drinking vessel 12 (FIG. 1) the carrier 3 is folded into the delivery shaft 2 and the small drinking vessel 12 is placed in a holder 11 on the carrier 3. A distance A between the delivery opening 5 and the carrier 3 is small in relation to the size of the vessel so that splashes are effectively prevented. A height H of the delivery shaft 2 is to be dimensioned so that a medium-sized drinking vessel 13 fits without unnecessary free space into the delivery shaft 2 (FIG. 2). The carrier 3 is folded in and out with the aid of a hinged joint arranged at the edge of the delivery shaft 2. The depth T of the delivery shaft 2 amounts to 3 cm. As can be seen from FIG. 3 a large drinking vessel 2 can be filled with the aid of the delivery opening 5 buy placing the large drinking vessel 20 on the folded-out carrier 3. The carrier 3 has a holder 11 for this purpose to guarantee that the container 4 is securely held. The carrier 3 has the force of a spring 9 applied to it, through which the carrier is moved into the interior of the delivery shaft 2 if there is no container 12, 13, 20 in the delivery shaft 2 (FIG. 2) or on the carrier 3 (FIG. 3). While the carrier 3 is located in the first position (FIG. 1) essentially inside the delivery shaft 2, in its second position (FIGS. 2 and 3) it is located essentially outside and below the delivery opening 2.

FIGS. 4 to 6 show a second exemplary embodiment of an inventive automatic device 1, which is intended to be built into a cabinet wall (not shown). The carrier 3 can be moved along a roller rail 7. In this case the carrier 3 can assume at least 3 different positions, with the carrier 3 also being able to be moved out beyond a panel 10 of the cabinet wall. This type of movement of the carrier enables different thicknesses of paneling 10 and to be used without delivery into different containers being prevented. In circular recess 15 is made in the carrier 3 in which the container 4 can be placed.

FIGS. 7 to 9 show a third exemplary embodiment of an inventive automatic device 1 with a carrier 3 able to be moved along a roller rail 7, with the carrier 3 being moved with the aid of a motor 8. Depending on the size of the container 4 the carrier 3 is moved into different positions essentially within or essentially outside the delivery shaft 2. In this case a small drinking vessel 12 is placed directly below and the delivery opening 5 whereas a large drinking vessel 20 (FIG. 9), which is larger than the delivery shaft 2 is held by the carrier 3 at an angle below the delivery opening 5.

FIGS. 10 and 11 show a fourth exemplary embodiment of an inventive automatic device 1, which once again is intended as a built-in device with a panel 10, with the carrier 3 being able to be hinged over the panel 10 with the aid of a pivot movement. The pivot movement is effected using a four-bar joint 21.

FIGS. 12 and 13 show a variation in which the carrier does not move and comprises a first fixed carrier section 17 and a second fixed carrier section 18, with the first carrier section essentially being located in the delivery shaft 2 and the second carrier section 18 essentially being located outside the delivery shaft 2. With the aid of the output opening 5 the container 4 is filled with the cooled goods 14, with a large drinking vessel 20 being placed on the second carrier section 18 and a medium-sized drinking vessel 13 on the first carrier section 17.

The invention relates to an automatic device for delivery of liquid or pourable goods, especially of cooled goods 14, preferably of cooled liquid, of pieces or water ice and/or crushed ice into different-sized containers 4, 12, 13 with a delivery shaft 2 for removal of the cooled goods 14 by means of a container 4, with a delivery opening 5 for the cooled goods 14, with a carrier 3 for the container 4 positioned at a distance A below the delivery opening 5, with the delivery shaft 2 being provided in the front side 19 of the automatic device 1 and accommodating the delivery opening 5, with the carrier 3 being able to adopt at least two positions, with the carrier being able to be moved back and forth between a first position essentially within the delivery shaft 2 and a second position essentially outside the delivery shaft 2. The outstanding feature of the invention is that different sizes of container 4 can be safely filled with cooled goods 14 without splashes, with the delivery shaft 2 being able to be dimensioned comparatively small, so that a heat bridge created by the delivery shaft 2 towards the inside of the automatic device 1 is reduced.

LIST OF REFERENCE SYMBOLS

1 Automatic device
2 Recess
3 Carrier
4 Container
5 Delivery opening
6 Pivot joint
7 Roller rail
8 Motor
9 Spring
10 Panel
a Distance
h Height
T Depth

The invention claimed is:

1. A device for supplying cooled goods, including in particular cooled water, ice cubes, or crushed ice, the device comprising:
   a.) means delimiting a recess relative to which a container can be disposed for receiving through an opening of the container cooled goods dispensed by the device;
   b.) means forming a device dispensing opening through which cooled goods are dispensed into a container disposed relative to the recess; and
   c.) a support carrier for supporting a container relative to the recess such that cooled goods can be dispensed to enter the container via an opening thereof, the support carrier being movable between a first position in which it supports the container relative to the recess with the device dispensing opening and the container opening being at a first predetermined opening-to-opening spacing from one another and a second position in which it supports the container relative to the recess with the device dispensing opening and the container opening being at a second predetermined opening-to-opening spacing from one another that is greater than the first predetermined opening-to-opening spacing, the support carrier being moved at least partly out of the recess in its movement between its first position into its second position with the result that the opening-to-opening spacing between the device dispensing opening and the container opening increases from the first predetermined opening-to-opening spacing to the second predetermined opening-to-opening spacing.

2. The device as claimed in claim 1, wherein the support carrier is pivotable out of the recess in its movement between its first position and its second position.

3. The device as claimed in claim 1, wherein the support carrier is movable entirely out of the recess in its movement between its first position and its second position.

4. The device as claimed in claim 1, wherein the support carrier is movable out of the recess in its movement between its first position and its second position via a rotational movement.

5. The device as claimed in claim 1, wherein the support carrier is movably connected to the device via at least one of a pivot joint, a rotary movement joint, and a roller rail.

6. The device as claimed in claim 1, wherein the support carrier includes a holder for a container, including in particular a holder that is circular in cross section.

7. The device as claimed in claim 1, wherein the support carrier is operable to support a container that is in the form of one of a beaker or a drinking glass, including in particular a beaker or a drinking glass with a capacity of around 0.5 liters.

8. The device as claimed in claim 1, wherein the recess has a height in a range of 10 cm to 15 cm, including in particular a range of 12 cm to 13 cm.

9. The device as claimed in claim 1, wherein the recess has a depth in the range of 2 cm to 5 cm, including in particular a range of 3 cm to 4 cm.

10. The device as claimed in claim 1, wherein the support carrier is operable to support a container having larger dimensions than the recess, including in particular a container in the form of a jug with a capacity of approximately one (1) liter.

11. The device as claimed in claim 1, wherein the support carrier is operable to be moved between its first and second positions by a drive, in particular a drive in the form of an electric motor.

12. The device as claimed in claim 1, wherein the support carrier is connected to a spring.

13. The device as claimed in claim 12, wherein the spring operates to move the support carrier more fully into the recess if the support carrier is not supporting a container thereon.

14. The device as claimed in claim 1, wherein the device is operable as a built-in device.

* * * * *